United States Patent [19]

Willner

[11] Patent Number: 4,990,744

[45] Date of Patent: Feb. 5, 1991

[54] UNDER FLOOR COVERING HEATING SYSTEMS

[75] Inventor: Jonathan Willner, Toronto, Canada

[73] Assignee: Nuheat Inc., Toronto, Canada

[21] Appl. No.: 380,312

[22] Filed: Jul. 17, 1989

[30] Foreign Application Priority Data

Nov. 15, 1988 [CA] Canada .................................. 583591

[51] Int. Cl.⁵ ............................................... H05B 3/26
[52] U.S. Cl. ..................................... 219/213; 219/528;
219/545; 219/548; 338/308
[58] Field of Search ............... 219/528, 529, 543, 545,
219/548, 549, 553, 2 B; 174/110 FC, 117 F;
338/308

[56] References Cited

U.S. PATENT DOCUMENTS

| | | |
|---|---|---|
| 2,744,996 | 5/1956 | Clark . |
| 3,454,747 | 7/1969 | Hart . |
| 3,539,767 | 11/1970 | Eisler . |
| 3,603,764 | 9/1971 | Martin ................................. 219/213 |
| 3,708,608 | 1/1973 | Wyman ........................... 174/117 F |
| 3,721,800 | 3/1973 | Eisler . |
| 3,852,570 | 12/1974 | Tyler . |
| 4,063,069 | 12/1977 | Peeri . |
| 4,069,410 | 1/1978 | Keep, Jr. . |
| 4,247,756 | 1/1981 | Cucinotta et al. . |
| 4,273,829 | 6/1981 | Perreault ....................... 174/110 FC |
| 4,581,522 | 4/1986 | Graham . |
| 4,587,402 | 5/1986 | Nishino ................................ 338/308 |
| 4,661,690 | 4/1987 | Yamamoto et al. . |
| 4,792,662 | 12/1988 | Kitagaki et al. . |

FOREIGN PATENT DOCUMENTS

| | | |
|---|---|---|
| 582766 | 4/1989 | Australia . |
| 1055094 | 5/1979 | Canada . |
| 1178319 | 11/1984 | Canada . |
| 2949511 | 6/1981 | Fed. Rep. of Germany . |
| 2116818 | 7/1972 | France . |
| 2247958 | 5/1975 | France . |
| 2489644 | 3/1982 | France . |
| 63-066888 | 3/1988 | Japan . |

Primary Examiner—Roy N. Envall, Jr.
Attorney, Agent, or Firm—Ivor M. Hughes; Neil H. Hughes

[57] ABSTRACT

An under floorcovering heating systems for positioning below a floorcovering is provided. The systems include pads having a heat conducting substrate within which is positioned solid conductor resistance heating wires in a serpentine manner for heating the substrate. The wire is covered by at least one layer of material providing electrical insulation and strong mechanical strength, jacketed by an electrically conductive "self-healing" ("self-curing") strong layer of material for the purposes of grounding and protecting the system. Also provided are electrical connecting mechanisms for connecting the resistance wire to a source of electricity including mechanisms connected to the jacketed conductive material for grounding the system.

17 Claims, 4 Drawing Sheets

UNDER FLOOR COVERING HEATING SYSTEMS

FIELD OF INVENTION

This invention relates to under floorcovering heating systems or pads and the like and in some applications, to systems and pads for the heating of carpets, broadloom, tiles and linoleum.

BACKGROUND OF THE INVENTION

Systems, pads and nets (resistance wire woven into a piece of material embodied in epoxy) have been proposed for positioning under carpets, broadloom, linoleum, tiles and the like for heating the covered floor area. When used with carpet and broadloom, the systems are positioned on the underlay or underpadding. When used with linoleum or tiles, the systems are applied directly onto the substrate or subfloor.

These systems and pads suffer many deficiencies. For example, the prior art systems are expensive to install, difficult to maintain and/or have many safety problems.

It is therefore an object of this invention to provide an improved under floorcovering heating system and pads and components therefor which are easily installed and serviced and of improved safety.

Further, and other objects of the invention will be realized by those skilled in the art from the following summary of the invention and detailed description of an embodiment thereof.

SUMMARY OF THE INVENTION

According to one aspect of the invention, there is provided under floorcovering heating systems and pads for positioning below a floorcovering, the systems and pads comprising (a) a heat conducting substrate (for example a bicomponent polymer [e.g. nylon and P.V.C. (Polyvinyl Chloride)) manufactured b BASF which can be rolled up for shipping and unrolled and positioned at the point of installation];

(b) solid conductor resistance heating wire positioned within the substrate in a serpentine manner for heating the substrate, the wire covered by at least one layer (and preferably two layers) of material providing electrical insulation and strong mechanical strength, jacketed by an electrically conductive "self-healing" ("self-curing") strong layer of material (for example a metal braid manufactured from for example stainless steel [one form manufactured by Harbour Industries, Normandie Avenue, Fanham Quebec]) for the purposes of grounding and protecting the system or pad; and (c) electrical connecting means for connecting the resistance wire to a source of electricity including means connected to the jacketed conductive material for grounding the said system or pad.

In one embodiment the solid conductor resistance heating wire is covered by two non-homogeneous (distinct) insulation layers of polytetrafluoroethylene preferably "TEFZEL" (t.m.) or "TEFLON"](t.m.) which are Registered Trade Marks of E.I. Du Pont de Nemours and Company of Wilmington, Del.

The insulation material provides high electrical insulation values while at the same time providing a strong mechanical or physical barrier. The material also preferably provides a good humidity barrier.

The solid conductor resistance heating wire provides preferably a fixed voltage per square foot. Therefore the resistance of the wire used is varied according to the size of system or pad. To achieve the variable resistance, different alloys may be used, for example an alloy of copper, tin, lead and platinum.

The jacketed "self-healing" layer of conductive material for example comprises braided stainless steel.

If a sharp foreign object (e.g. pin or nail) engages the layer of "self-healing" material (for example the braid), the material (e.g. braid) resists penetration. If the material is penetrated by the object and then removed, the material (e.g. braid strands) "self-heals" and covers up the opening created by the penetration of the foreign object (for example, the strands of braid move to fill the gap, moving towards their original position).

According to another aspect of the invention an under floorcovering heating system and pads for positioning below a floorcovering (e.g. carpet, broadloom, tile and linoleum and the like) is provided, the system and pads comprising (a) a heat conducting substrate (for example a bicomponent polymer [e.g. nylon and P.V.C. (polyvinyl Chloride) manufactured by BASF which can be rolled up for shipping the unrolled and positioned at the point of installation];

(b) conductor resistance heating wire having two ends, positioned in the substrate in a serpentine manner for heating the substrate and being covered by an electrically conductive layer for the purposes of grounding the protecting the system.

(c) a connector for connecting the ends of the conductor resistance heating wire to a source of electricity, the connector comprising a body having a positive terminal, a negative terminal and a ground, the positive terminal, negative terminal and ground each carrying holes therethrough, to permit the ends of the wires to be threaded through the holes in the negative and positive terminal, and the electrically conductive layer to be threaded through the holes of the ground and, to permit material of the wire and the electrically conductive material proximate the holes (when threading is complete) to be mechanically fixed to fastened to the connector by material (e.g. solder or a welding material) filling the holes.

According to another aspect of the invention an under floorcovering heating system and pads for positioning below a floorcovering is provided, the systems and pads comprising a combination of the components previously described.

A thermostat may be connected to the system or pad to control the temperature, however not being part of the invention, is not further described.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

Figure 1:
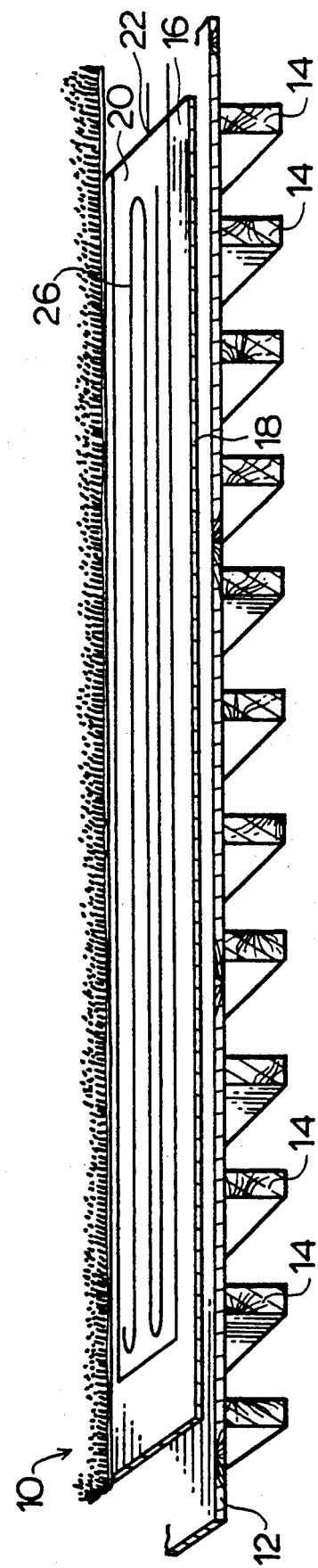
FIG. 1 is a schematic cutaway perspective view of a carpet installed on a wooden floor having an under floorcovering heating system disposed on the underlay or underpad according to one embodiment of the invention.

With reference to FIG. 1, there is shown carpet 10 supported on wooden floor 12 supported by wood beams 14. Underpad or underlay 16 is interposed between the floor 12 and carpet 10 and carries on its upper surface 18, under floorcovering heating system 20 comprising (a) heat conducting substrate 22 being a bicomponent polymer of nylon and P.V.C. manufactured by BASF which can be rolled up for shipping and unrolled and positioned at the point of installation.

Figure 3:
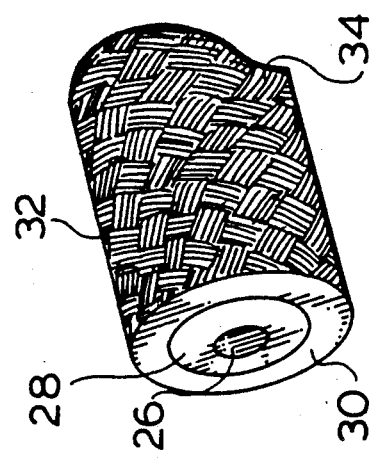
FIG. 3 is a close-up perspective view of resistance wire used in the embodiment shown in FIGS. 1 and 2.

(b) solid conductor resistance heating wire 26 (an alloy of copper, tin, lead and platinum) positioned within the substrate 22 in a serpentine manner for heating the substrate 22, resistance heating wire 26 being covered by two non-homogeneous distinct layers of 28 and 30 polytetrafluoroethylene preferably "TEFZEL" which is a Registered Trade Mark of E.I. Du Pont de Nemours and Company of Wilmington, Del. (manufactured by Dupont) 28 and 30 (see FIG. 3) to provide electrical insulation and strong mechanical strength and surrounded by jacket 32 of braided stainless steel 34 (manufactured by Harbour Industries, Normandie Avenue, Fanham Quebec) for the purposes of grounding the system and protecting the system.

Figure 4:
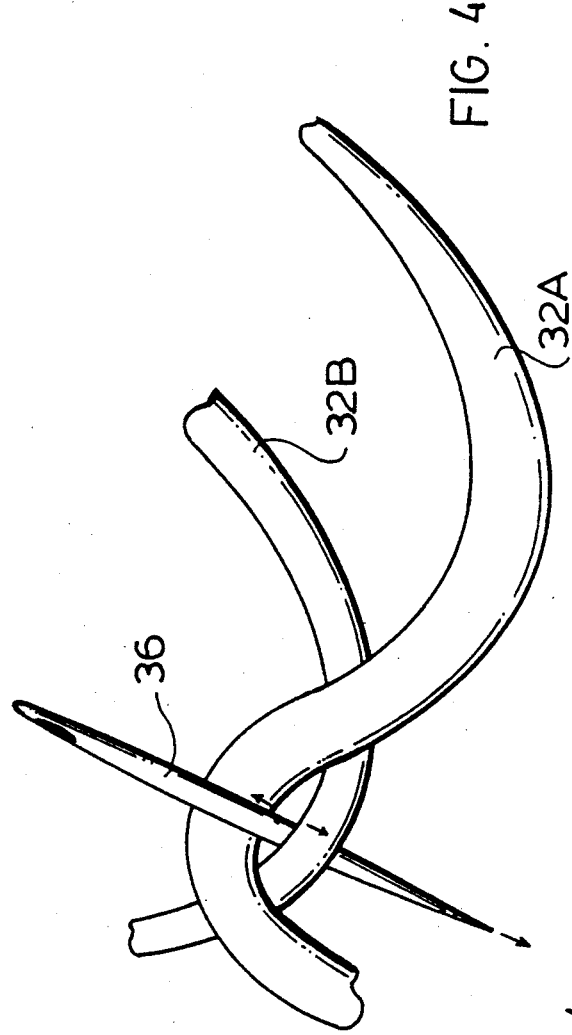
FIGS. 4 and 5 are close-up views illustrating the "self-healing" ("self-curling") abilities of the jacket covering of the resistance wire to the penetration by a foreign object.
Figure 5:
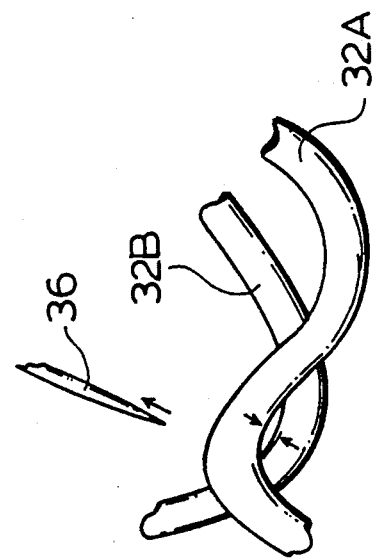

With reference to FIGS. 4 and 5, two braid strands 32A and 32B of jacket 32 are shown. When a foreign object 36 (as for example a pin 36) penetrates the space between adjacent braids 32A and 32B, the braids are displaced (see FIG. 4). When however the object is removed, the braids "self-heal" moving towards their original position covering the opening.

Figure 2:
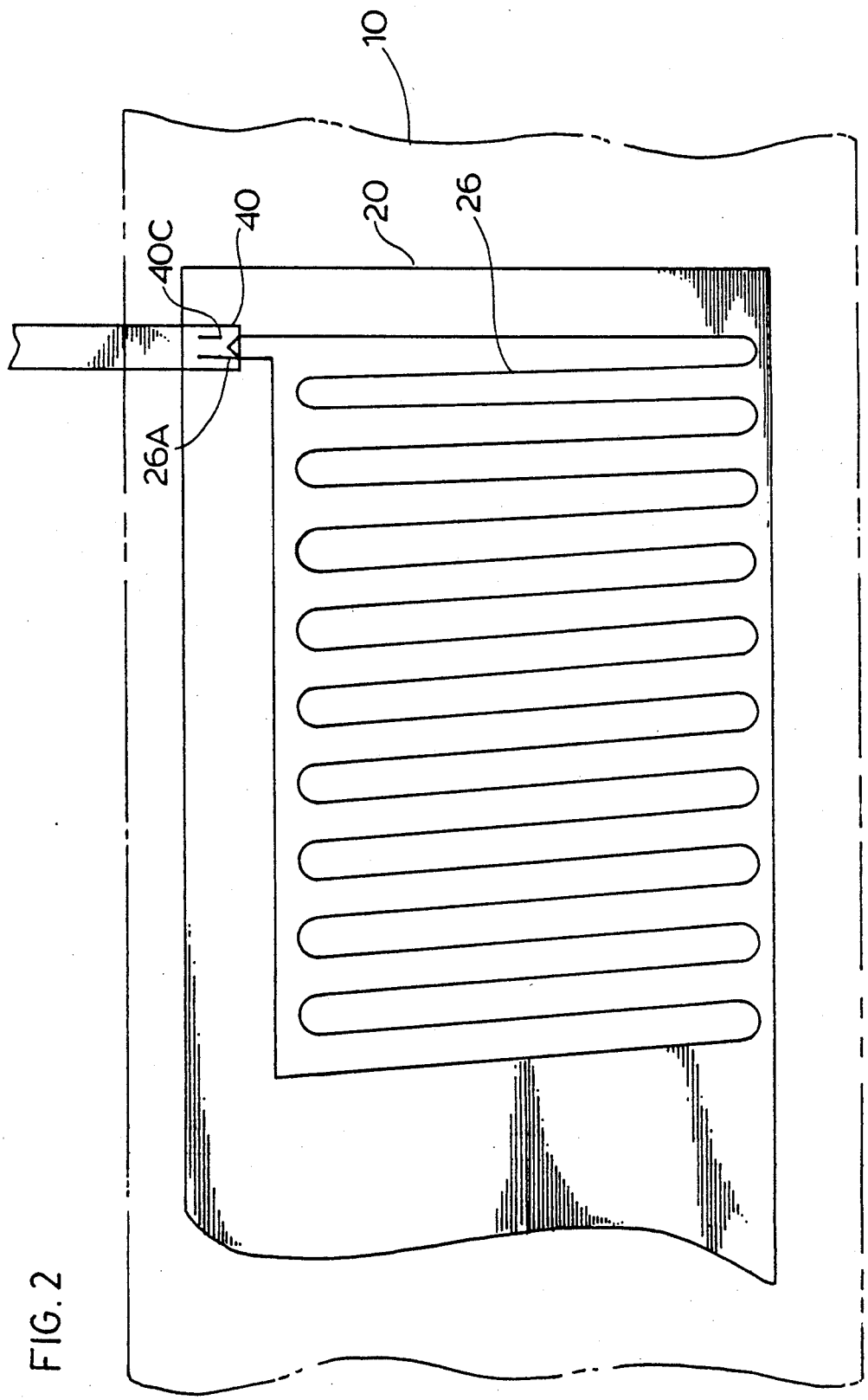
FIG. 2 is a top plan view illustrating in plan some of the member shown in FIG. 1.
Figure 6:
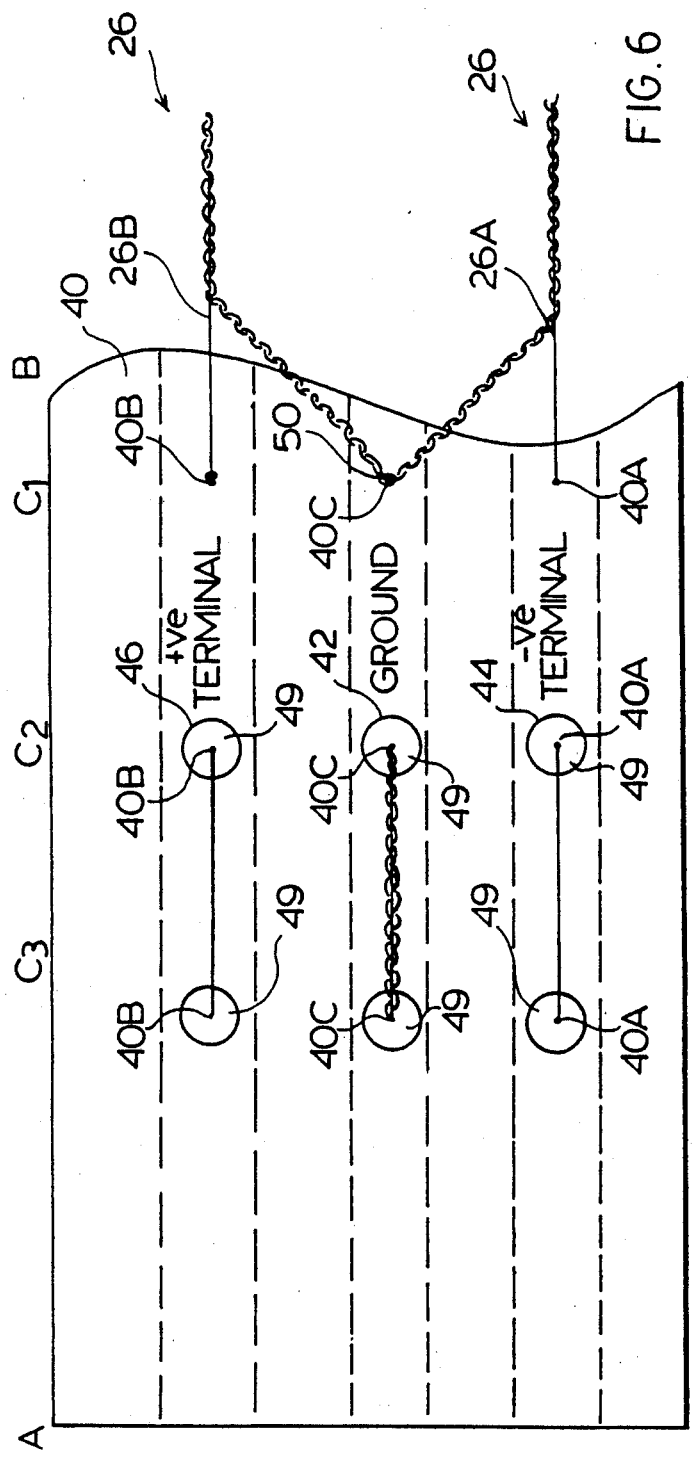
FIG. 6 is a close-up view of the connector shown in FIG. 2 according to an embodiment of the invention.
Figure 7:
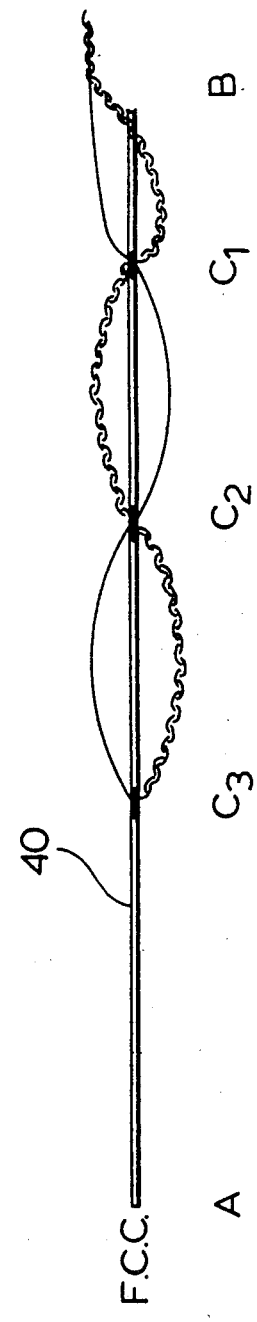
FIG. 7 is a side view of the connector shown in FIG. 6 to which the resistance heating wire and jacketed material are connected.

With reference to FIG. 2, 6, and 7, flat copper connector 40 is provided to which the ends 26A and 26B of the resistance wire 26 and electrically connected. With reference to FIG. 6, jacket 32 has been removed from each end of the cable and is fastened to ground 42 in the connector 40. Wire ends 26A and 26B are connected to the different terminals—wire end 26A to negative terminal 44 and wire end 26B to positive terminal 46. Connector 40 comprises a pair of holes 40A through the negative terminal, a pair of holes 40B through the positive terminal and a pair of holes 40 c through the ground 42. With reference to FIGS. 6 and 7, ends 26A and 26B have been threaded through holes 40A and 40B respectively (over and under) and the material of the resistance wire 26 proximate the holes is soldered or welded to the connector 40 with the soldering or welding material filling the holes as at 49. Similarly, the jacketed stainless steel braided material 34 removed from each of the wires 26 is gathered as at 50 threaded through the holes 40 c (over and under) and soldered as at 49.

A thermostat (not shown) may be provided on a wall (not shown).

The solid conductor resistance heating wire preferably provides a fixed voltage per square foot. Therefore the resistance of the wire used is varied according to the size of the system or pad. To achieve the variable resistance, different alloys may be used to comprise the solid conductor material (for example an allow of copper, tin, lead and platinum).

As many changes can be made to the embodiment of the invention without departing from the scope of the invention, it is intended that all material herein be interpreted as illustrative of the invention and not in a limiting sense.

The embodiments of the invention in which an exclusive property or privilege is claimed are as follows:

1. An under floorcovering heating system for positioning below a floorcovering, each of the systems comprising
   (a) a heat conducting substrate;
   (b) solid conductor resistance heating wire positioned within the substrate in a serpentine manner for heating the substrate, the wire covered by at least one layer of material providing electrical insulation and strong mechanical strength, jacketed by an electrically conductive "self-healing" strong layer of material for the purposes of grounding the protecting the system or pad; and
   (c) electrical connecting means for connecting the resistance wire to a source of electricity including means connected to the jacketed conductive material for grounding the said system.

2. The under floorcovering system of claim 1, wherein the "self-healing" strong layer of material comprises a metal braid of material.

3. The under floorcovering system of claim 2, wherein the metal braid of material is a metal braid of stainless steel material.

4. The under floorcovering system of claim 1, wherein the at least one layer of material providing electrical insulation and strong mechanical strength is two distinct layers.

5. The under floorcovering system of claim 2, wherein the at least one layer of material providing electrical insulation and strong mechanical strength is two distinct layers.

6. The under floorcovering system of claim 3, wherein the at least one layer of material providing electrical insulation and strong mechanical strength is two distinct layers.

7. The under floorcovering system of claim 4, wherein the solid conductor resistance heating wire comprises two non-homogeneous insulation layers.

8. The under floorcovering system of claim 5, wherein the solid conductor resistance heating wire comprises two non-homogeneous insulation layers.

9. The under floorcovering system of claim 6, wherein the solid conductor resistance heating wire comprises two non-homogeneous insulation layers.

10. The under floorcovering system of claim 1, 2 or 3, wherein the substrate can be rolled up for shipping and unrolled and positioned at the point of installation.

11. The under floorcovering system of claim 4, 5 or 6, wherein the substrate can be roller up for shipping and unrolled and positioned at the point of installation.

12. The under floorcovering system of claim 7, 8 or 9, wherein the substrate can be rolled up for shipping and unrolled and positioned at the point of installation.

13. An under floorcovering heating system for positioning below a floorcovering, the system comprising
   (a) a heat conducting substrate;
   (b) conductor resistance heating wire having two ends positioned in the substrate in a serpentine manner for heating the substrate and being covered by an electrically conductive layer for the purposes of grounding and protecting the system;

(c) a connector for connecting the ends of the conductor resistance heating wire to a source of electricity, the connector comprising a body having a positive terminal, a negative terminal and a ground, the positive terminal, negative terminal and ground each carrying holes therethrough to permit the ends of the wires to be threaded through the holes in the negative and positive terminal, and the electrically conductive layer to be threaded through the holes of the ground and to permit material of the wire and the electrically conductive material proximate the holes to be mechanically fixed or fastened to the connector by material (e.g. solder or a welding material) filling the holes.

14. The under floorcovering system of claim 13, wherein the substrate can be rolled up for shipping and unrolled and positioned at the point of installation.

15. The under floorcovering system of claim 2 or 3, wherein the resistance wire has two ends and the electrical connecting means for connecting the resistance wire to a source of electricity including means connected to the jacketed conductive material for grounding the said system comprises a connector for connecting the ends of the conductor resistance heating wire to a source of electricity, the connector comprising a body having a positive terminal, a negative terminal and a ground, the positive terminal, negative terminal and ground each carrying holes therethrough to permit the ends of the wires to be threaded through the holes, in the negative and positive terminal and the electrically conductive layer to be threaded through the holes of the ground and to permit material of the wire and the electrically conductive material proximate the holes to be mechanically fixed or fastened to the connector by material (e.g. solder or a welding material) filling the holes.

16. The under floorcovering of claim 4, 5, or 6, wherein the resistance wire has two ends and the electrical connecting means for connecting the resistance wire to a source of electricity including means connected to the jacketed conductive material for grounding the said system comprises a connector for connecting the ends of the conductor resistance heating wire to a source of electricity, the connector comprising a body having a positive terminal, a negative terminal and a ground, the positive terminal, negative terminal and ground each carrying holes therethrough to permit the ends of the wires to be threaded through the holes, in the negative and positive terminal and the electrically conductive layer to be threaded through the holes of the ground and to permit material of the wire and the electrically conductive material proximate the holes to be mechanically fixed to fastened to the connector by material (e.g. solder or a welding material) filling the holes.

17. The under floorcovering of claim 7, 8 or 9, wherein the resistance wire has two ends and the electrical connecting means for connecting the resistance wire to a source of electricity including means connected to the jacketed conductive material for grounding the said system comprises a connector for connecting the ends of the conductor resistance heating wire to a source of electricity, the connector comprising a body having a positive terminal, a negative terminal and a ground, the positive terminal, negative terminal and ground each carrying holes therethrough to permit the ends of the wires to be threaded through the holes, in the negative and positive terminal and the electrically conductive layer to be threaded through the holes of the ground and to permit material of the wire and the electrically conductive material proximate the holes to be mechanically fixed or fastened to the connector by material (e.g. solder or a welding material) filling the holes.

* * * * *